(12) United States Patent
Van Bekkum et al.

(10) Patent No.: US 10,234,353 B2
(45) Date of Patent: Mar. 19, 2019

(54) AUTOMATIC PRESSURE CORRECTION FOR LEVEL GAUGES IN STORAGE TANKS

(71) Applicant: Honeywell International Inc., Morris Plains, NJ (US)

(72) Inventors: Frank Van Bekkum, Zuid Holland (NL); Michiel Althof, Eindhoven (NL); Ard Van Schie, Zuid Holland (NL)

(73) Assignee: Honeywell International Inc., Morris Plains, NJ (US)

( * ) Notice: Subject to any disclaimer, the term of this patent is extended or adjusted under 35 U.S.C. 154(b) by 141 days.

(21) Appl. No.: 15/207,693

(22) Filed: Jul. 12, 2016

(65) Prior Publication Data

US 2017/0307461 A1 Oct. 26, 2017

Related U.S. Application Data

(60) Provisional application No. 62/325,771, filed on Apr. 21, 2016.

(51) Int. Cl.

| | |
|---|---|
| *G01L 27/00* | (2006.01) |
| *G01F 23/14* | (2006.01) |
| *G01S 7/40* | (2006.01) |
| *G01S 7/52* | (2006.01) |
| *G01F 23/00* | (2006.01) |
| *G01F 25/00* | (2006.01) |
| *G01F 23/284* | (2006.01) |

(52) U.S. Cl.
CPC ........ *G01L 27/005* (2013.01); *G01F 23/0076* (2013.01); *G01F 23/14* (2013.01); *G01S 7/40* (2013.01); *G01S 7/52004* (2013.01); *G01F 23/0023* (2013.01); *G01F 23/284* (2013.01); *G01F 25/0061* (2013.01)

(58) Field of Classification Search
CPC ............................... G01L 27/005; G01F 23/14
See application file for complete search history.

(56) References Cited

U.S. PATENT DOCUMENTS

| | | | | |
|---|---|---|---|---|
| 2008/0270162 | A1* | 10/2008 | Machacek | G05B 23/0221 |
| | | | | 702/182 |
| 2009/0282892 | A1 | 11/2009 | Sai | |
| 2012/0234074 | A1* | 9/2012 | Hagen | G01F 1/32 |
| | | | | 73/1.73 |
| 2015/0377686 | A1* | 12/2015 | Hagen | B60K 15/03 |
| | | | | 73/313 |
| 2016/0054164 | A1* | 2/2016 | Hershey | G01F 23/284 |
| | | | | 73/292 |

* cited by examiner

*Primary Examiner* — Ryan D Walsh

(57) ABSTRACT

A level gauge system for mounting on a roof of a semi-closed storage tank includes an automatic tank level gauge for determining a level reading for a liquid including at least one liquid component in the tank. A processor includes a memory storing pressure correction factors or a pressure correction factor equation for correcting the level reading for a measured gas pressure above the liquid in the tank. The processor is programmed for implementing choosing a selected pressure correction factor from the pressure correction factors or the equation based on a received current gas pressure above, and applying the selected pressure correction factor for automatically correcting the level reading provided by the tank level gauge to generate a corrected level reading which compensates for the current gas pressure above effects on the roof and on the level gauge.

10 Claims, 4 Drawing Sheets

AUTOMATIC PRESSURE CORRECTION FOR LEVEL GAUGES IN STORAGE TANKS

CROSS REFERENCE TO RELATED APPLICATIONS

This application claims the benefit of Provisional Application Ser. No. 62/325,771 entitled "AUTOMATIC PRESSURE CORRECTION FOR LEVEL GAUGES IN STORAGE TANKS", filed on Apr. 21, 2016, which is herein incorporated by reference in its entirety.

FIELD

Disclosed embodiments relate to pressure correction for automatic tank level gauges.

BACKGROUND

Automatic tank level gauges are used to measure the product liquid level in bulk storage tanks. Most level gauges are installed on the tank roof for this purpose. As many of these tanks contains volatile products, where often the vapors are environmentally harmful or even toxic, it is desirable to limit the evaporative losses/emissions. As a result tanks containing these type of harmful products (e.g., gasoline or oil) include breather valves (also known as pressure/vacuum relief valves) which have an open and a closed position so that they are not freely breathing when closed, compared to a vent that would always be open. Opening the breather valve at a pressure protecting level prevents the buildup of excessive pressure or vacuum which can unbalance the system or damage the storage vessel.

Tanks which are freely venting have as a disadvantage that during the day-night cycle they allow product vapors to escape into the atmosphere which can create an environmental hazard, bad smell, and loss of product. Breather valves reduce these losses by keeping the tank closed. During loading product is moved into the tank, and equivalent amount of air is replaced. If this air would not be allowed to leave the tank, it would damage the tank construction and as result it's integrity. If product is moved out of the tank, and no air would be allowed to be replaced needed to remove liquid, so that one would create a 'vacuum' and also damage the tank. Hence breathers valve prevent both the build-up of an excessive high and also low pressure. They generally only allow a small over or under pressure, typically several inches of water only (compared to the atmospheric pressure) under the tank roof.

The breather valves can open when excessive pressure occurs, for example when product is pumped into the tank, or can also allow to air enter the tank, when product is pumped out of the tank and a vacuum is created. These breather valves are not servo-controlled, but typically just react on the pressure. This maximum and minimum pressure is normally in the range of 20 mm to 30 mm water pressure. This range although modest is important to understand the function and construction of a typical fixed tank roof and realize the generally enormous size of typical tanks used for bulk storage. These tanks which can easily have diameters of 20 m or more, and experience a considerable 'lifting' force when this small pressure is present therein. Accordingly, the tank construction is sensitive for especially the outward (positive) pressure.

Consequently the 'fixed' roof on these storage tanks is not firmly welded to the tank construction. Instead, the roof s only welded on the rim, and not on the roof support so that it lays on support beams. As result the roof construction is a not as rigid as one might expect, so that even the relative small vapor pressure caused by the evaporated product in the tank can cause the roof to be lifted considerably, and in the case of an tank fire or explosion, the tank roof can be blown off, since this is safer than if the tank floor fails and the tank explodes into the air. The vapor pressure in the tank can thus affect the level measurement.

An issue that typically arises for level gauges used for inventory and custody transfer applications being tank top mounted and installed high on the tank, is that they can only measure the distance between the level gauge (or more precisely the vertical location where the gauge is installed) and the liquid's top surface. This distance is generally called Ullage or Outage (US). In the level gauge the 'ullage' is then converted (mathematically in software) to a product height which tends to be called 'Innage'. The math is relatively simple: Innage=GRH−Ullage, where GRH=the Gauge Reference Height.

The innage calculation assumes the GRH is stable and doesn't move up and down. It should be clear that if the level gauge is installed on a stilling well or stand pipe then there is provided a stable platform for level gauging. If there is however no stilling well (basically a perforated stand pipe of roughly 6 to 12 inches in diameter) one has a challenge. Installing a stand pipe requires the tank to be out of service, which thus incurs significant cost. Moreover, if the tank is also equipped with a floating roof, it is nearly impossible to retrofit such a tank with a stand pipe at a later stage. Hence in these cases the level gauge is often installed on just the tank roof, and as result the pressure can affect the (innage) level reading.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize the gas pressure above the liquid under the roof of a semi-closed storage tank can cause roof 'bulging' which changes the vertical position of the gauge installed on the roof in reference to the tank bottom level, and thus effects the gauge reported liquid level height. As used herein, a "semi-closed" tank refers to bulk liquid storage tanks which are neither hermitically sealed (such as pressurized tanks), or completely open to the atmosphere. Such tanks include restricted openings to the atmosphere by including a breather valve, which are pressure/vacuum relief valves that have a pressure triggered open position and a closed position.

The opening of the breather valves prevents the build-up of excessive pressure or vacuum which can unbalance the system or damage the storage tank. Pressure and vacuum protection levels are controlled with weighted pallets or springs which can be combined to provide the desired pressure/vacuum settings. There are also tanks which have a nitrogen blanket (sometimes called purged), such as for reducing oxidation of the product or in order to reduce the explosion risk by lowering the oxygen content. Such "purged" tanks are thus semi-closed tanks as used herein because their level readings will be affected if the 'purge' pressure varies over time.

As these level gauges actually measure the vertical distance between the gauge and the liquid top surface, the problem of a considerable measurement error of the level can be introduced due to bulging caused by the gas pressure above the liquid (which can be a lower or higher pressure relative to atmospheric pressure) under the roof of a semi-closed storage tank. This level measurement error can make these tanks unsuitable for accurate tank inventory measurement and consequently unusable for custody transfer transactions and legal metrology applications where import duties are levied. Disclosed level gauges may also be used for tanks which are not involved in custody transfer or used for legal metrology because the reduced level uncertainty provided can be helpful, as it allows for better inventory management (i.e. liquid stock accounting to know where the tank material is).

Disclosed embodiments include level reading correction for automatic tank level gauges on the roof of a semi-closed storage tank that compensates for the gas pressure effects on the position of the roof and thus the level gauge thereon in reference to the tank bottom. The current gas pressure above the liquid in the tank is used to calculate a level correction factor which is applied to the level measurement to provide a corrected level reading. Once corrected the level measurement uncertainty is generally reduced sufficiently to comply with requirements for custody transfer and even legal metrology. Consequently disclosed embodiments can provide substantial savings for operators of all semi-closed tanks containing volatile liquids (e.g., hydrocarbon mixtures).

DETAILED DESCRIPTION

Figure 1:
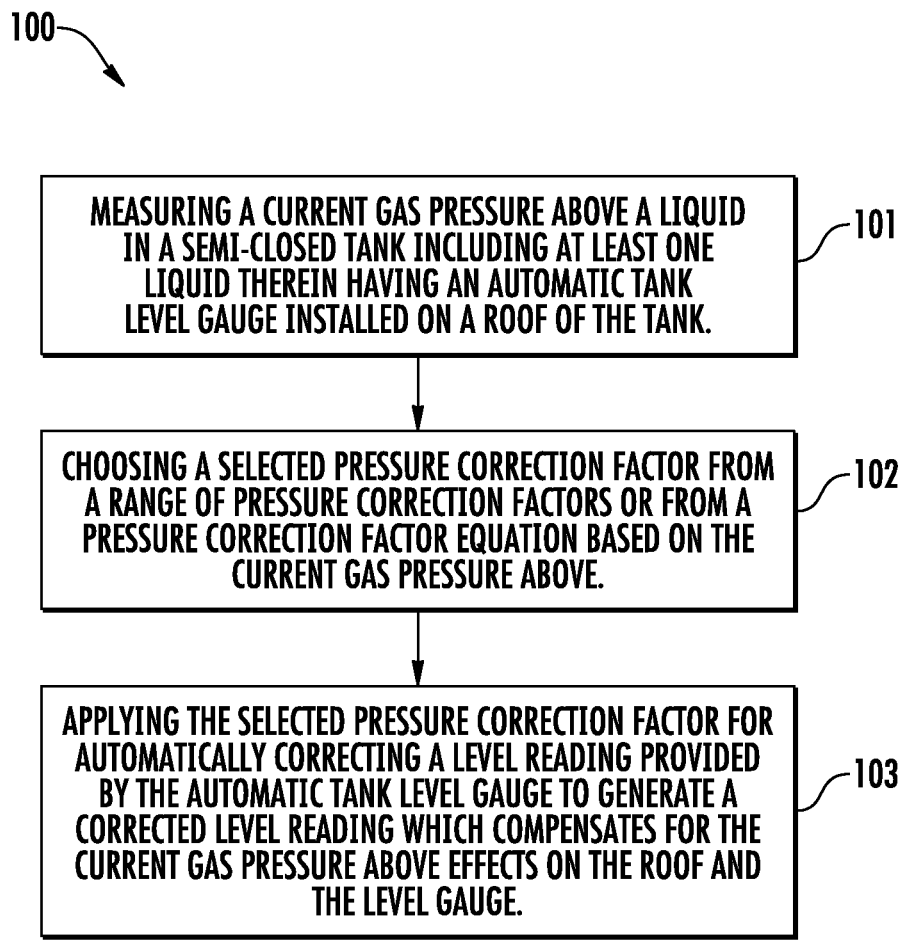
FIG. 1 is a flow chart that shows steps in a method of automatic gas pressure correction for level gauges that sense the level in semi-closed storage tanks, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

FIG. 1 is a flow chart that shows steps in a method 100 of automatic gas pressure above the liquid correction for level gauges for sensing the level in semi-closed storage tanks, according to an example embodiment. Step 101 comprises measuring a current gas pressure above the liquid (gas pressure above) in a semi-closed tank including at least one liquid component therein (e.g., a hydrocarbon or a hydrocarbon mixture, such as oil or gasoline) having an automatic tank level gauge installed on a roof of the tank. It is noted that the gas pressure above is not the same as the vapor pressure in the tank since the term vapor pressure (or equilibrium vapor pressure) is defined as the pressure exerted by a vapor in thermodynamic equilibrium with its condensed phases (solid or liquid) at a given temperature in a closed system.

In the case of method 100 the tank is semi-closed and the pressure above the liquid is the gas pressure in the void region of the tank (above the liquid under the roof of the tank). This gas pressure above is partly determined by the vapor pressure (the evaporation rate), but also by external factors (including any pumping of liquid in or out of the tank), and also by the presence of other gas components in the tank (e.g. from previous cargoes). Method 100 is of particular benefit in high accuracy level-based tank gauges, such as used for legal metrology and custody transfer. However, method 100 can also be used also for level gauges used for inventory management if the cost for implementing added level accuracy can be economically justified.

Step 102 comprises choosing a selected pressure correction factor from a range of pressure correction factors based on the current gas pressure above. The correction factors are generally based on empirical measurements (but not necessarily) which can be used to either develop an equation, or generate a look-up table used by a processor with an interpolation mechanism (e.g., first order, or a higher order (e.g., LaGrange) interpolation. A linearized method (equating) results in less data needing to be stored and thus less memory usage. It may also be possible to utilize mathematical modelling (simulation) instead of empirically derived data.

Step 103 comprises applying the selected pressure correction factor for automatically correcting (e.g., using a software compensation to correct) a level reading provided by the automatic tank level gauge to generate a corrected level reading which compensates for the current gas pressure above effects on the roof and thus the level gauge being on the roof which would otherwise change the vertical position of the level gauge in reference to the tank bottom. Software compensation (as opposed to hardware) to correct the level measurement for the effect of gas pressure above on vertical position of the gauge in reference to the tank bottom is generally lower in cost and provides a high level of flexibility, such as to respond to changes in the liquid.

Figure 2A:
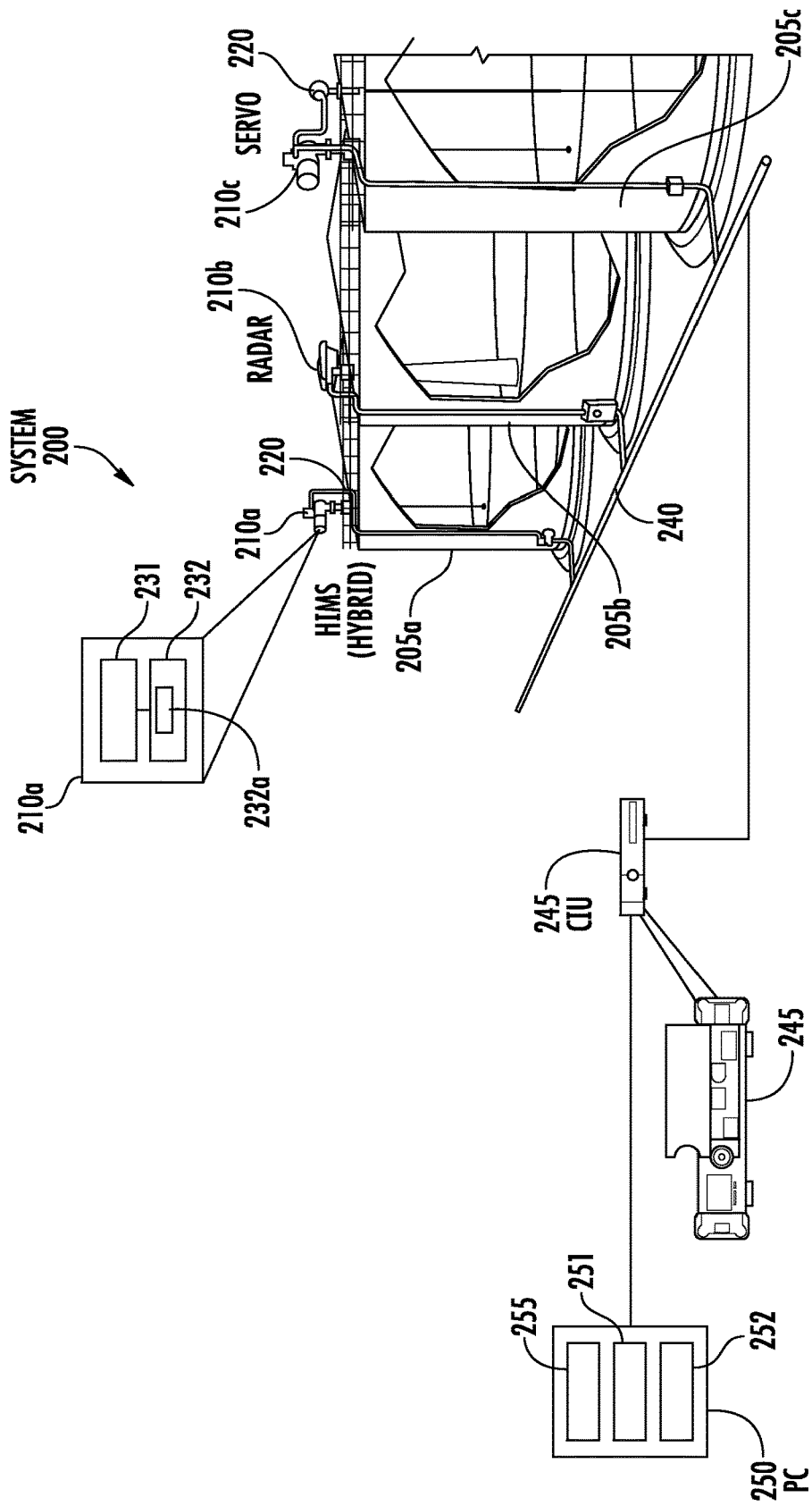
FIG. 2A shows a disclosed level gauge that performs the automatic gas pressure correction that is integrated into a complete tank gauging system for semi-closed storage tanks, according to an example embodiment.

Disclosed level gauges that itself perform the automatic pressure above correction is shown in FIG. 2A as 210a (shown as a HIMS (hybrid gauge)) for tank 205a, 210b (shown as a radar gauge) for tank 205*b* and 210*c* (shown as servo gauge) for tank 205*c* that are integrated into a complete tank gauging system 200. In this embodiment the level gauges 210*a*, 210*b* and 210*c* include (with level gauge 210*a* shown including) a processor 231 having a memory 232 storing pressure correction factors or a pressure correction factor equation and a stored pressure correction for level gauges algorithm 232*a* for correcting the level reading for a measured gas pressure above in the tank. The processor 231 can comprise a microprocessor, digital signal processor (DSP), or a microcontroller unit (MCU). Tank gauging system 200 is shown including a pressure gauge 220 for each tank for providing a gas pressure above reading to enable the processor 231 of the level gauge to provide corrected level measurements. An advantage of the level correction being performed at the level gauge is for practical reasons (i.e. have a corrected level on the level gauge and on the tank).

Disclosed level gauges may be within an explosion-proof housing. Disclosed level gauges can be a non-contact radar level gauge, a contact level gauge, or more generally any level gauge which is installed on the tank roof. The tank top mounted level gauges can be installed on a stilling well (which is a perforated stand pipe) in which they measure the product level, or just 'penetrate' the roof. The standpipe can be supported out of the tank bottom, or be hanging from the roof. In the cases of a hanging stilling well and directly through the roof measurement, the gauge is basically only mounted on the roof. It is noted that most level gauges are only capable of measuring distance (what is called 'Ullage' or 'Outage' (US) in the industry), i.e. the distance between gauge/roof and liquid product. However, the customer generally wants to know how high the product level is called Innage. So, all these known level gauges simply calculate from the measured distance the equivalent liquid height (i.e. Level in tank=tank top minus measured distance, on industry terminology: Innage=Gauge Reference Height GRH–Ullage). This works fine as long as the vertical height of the where the gauge is installed (=GRH) is stable and doesn't move up and down.

The problem recognized herein is all that all these tanks bulge as result of the weight of the liquid in the tank (i.e. the hydrostatic pressure), and as the product level moves, the bulging changes. But not only the hydrostatic pressure changes, also the gas pressure under the roof can influence the roof and if the level gauge is not installed on a properly bottom supported stilling well it will 'lift' the roof and level gauge thereon. The GRH varies and thus the product level becomes incorrectly computed. Disclosed embodiments solve this problem by measuring this gas pressure above and using the gas pressure above to correct the GRH in the above equation so that despite bulging that can lift or lower the position of the level gauge, the measured ullage can be corrected to essentially a true value.

There are a few level gauging technologies which use a different technology such as hydrostatic tank gauging (HTG) which may also be used. The corrected level reading which compensates for effects of the current gas pressure above on the roof which would otherwise change the vertical position of the gauge in reference to the tank bottom that is output of the level gauges 210*a*, 210*b* and 210*c* are all shown coupled to a communication interface unit (CIU) 245 by a bus shown for example as a fieldbus 240. CIU 245 is generally coupled to a PC 250 in a control room of the plant so that the level data can be displayed remotely. PC 250 includes a monitor 255, a processor 251 and a memory 252. The level gauges 210*a*, 210*b* and 210*c* can include other supported features including temperature measurement.

Figure 2B:
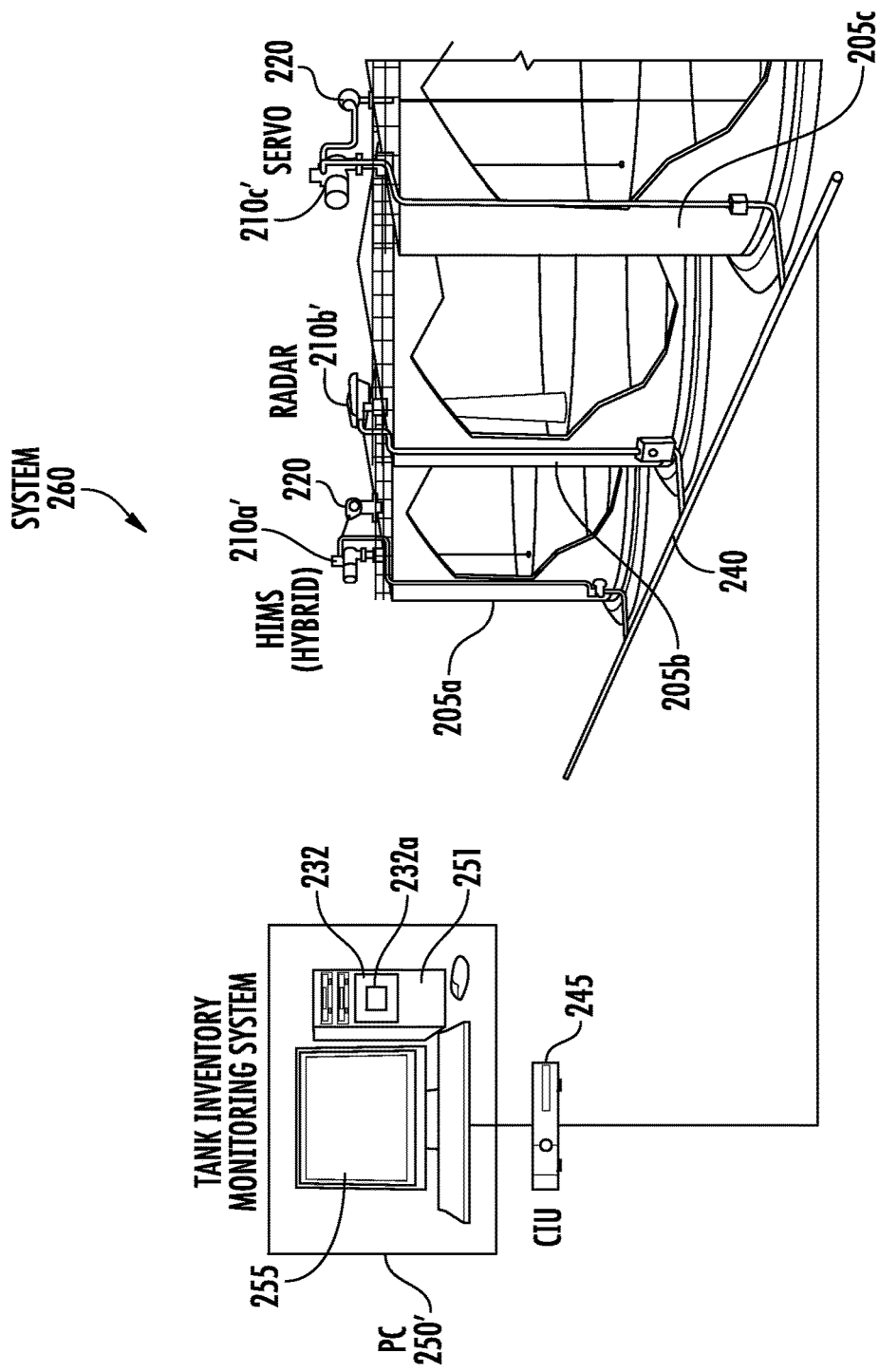
FIG. 2B shows a tank gauging system where the level gauges do not include disclosed level correction for gas pressure above, and level data and vapor pressure data is be transmitted via a long distance field communication to a computing device shown as a personal computer (PC) in the control room that provides the level data correction, according to an example embodiment.

FIG. 2B shows an alternative tank gauging system 260, where the level gauges shown as 210*a*' (shown as a HIMS) for tank 205*a*, 210*b*' (shown as a radar gauge) for tank 205*b* and 210*c*' (shown as a servo gauge) for tank 205*c* do not include disclosed level correction, where the level data and pressure data is instead transmitted via any suitable long-distance field communication method for communicating from the level gauges and the pressure gauges 220 to a computing device shown as PC 250' in the control room that provides the level data correction, such as using a cable-based communication. PC 250' which implements a tank inventor monitoring system includes a monitor 255, a processor 251 and a memory 232 having a stored pressure correction for level gauges algorithm 232*a*. Alternatively, level correction can also be performed by the CIU 245. Although not shown, a wireless solution is an alternative arrangement that can save installation cost and enable full tank gauging functionality for remote tanks and where long distance field wiring is impractical.

As noted above, disclosed embodiments can be applied to generally servo and radar-types of level gauges. Both pulse (non-contact) and Frequency Modulated Continuous Wave (FMCW, contact) radar techniques are possible. The pulse method implementing time-domain reflectometry (TDR) as known in the art measures the time it takes for a pulse to travel to the product surface and back. Pulse radar level gauges are mainly available for lower accuracy applications. FMCW is generally used by high performance radar level gauges.

Examples

Disclosed embodiments are further illustrated by the following specific Examples, which should not be construed as limiting the scope or content of this Disclosure in any way.

Figure 3A:
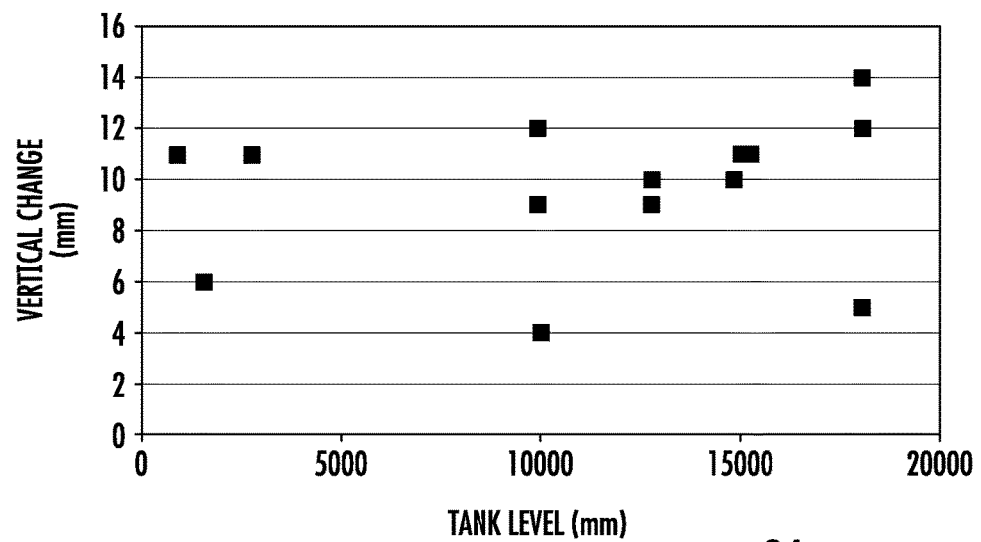
FIG. 3A shows an empirical plot of the vertical change (lift of the roof and the level gauge installed on the roof) caused by the gas pressure above in millimeters (mm) vs. the tank liquid level in mm, according to an example embodiment.

FIG. 3A shows an empirical plot of the vertical change (lift of the roof and the lift of the level gauge installed on the roof caused by the gas pressure above) in mm vs. the tank liquid level in mm. This vertical change (change in height) is what the level reading is to be corrected for. The vertical change was calculated from empirical data performed by the customer for 16 tanks, performed with different levels in the tank from almost empty to almost full. It was found that this vertical change is essentially linear over the full pressure range set by the pressure-vacuum (PV) vents and that it is a constant factor independent of the product level in the tank. The data in FIG. 3A was mostly used to verify the noted vertical roof deviation was not also caused by hydrostatic bulging of the tank. Hydrostatic bulging is caused by the pressure exerted on the tank shell by the weight of the liquid. As result the tank shell bulges (mostly about 1 m above the tank floor), and as it bulges the tank's roof and the GRH comes down vertically.

Figure 3B:
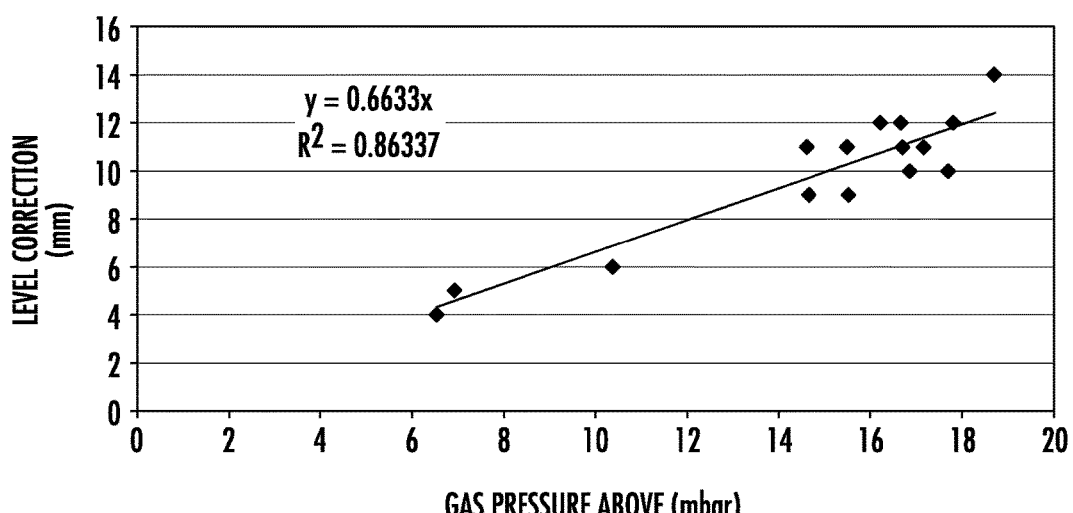
FIG. 3B is a plot of the level correction in mm vs. the gas pressure above in mbars, according to an example embodiment.

FIG. 3B is a plot of the level correction in mm based on a calculation described above vs. the gas pressure above in mbars. The line shown is a linear approximation thru the empirical data points therein. Data was collected manually and using a servo gauge of a level gauge system. The correlation was automatically performed by a mathematical method, such as PC-based spreadsheet program (e.g., EXCEL). The line shown can be used to generate a level correction factor given a current gas pressure above value. It is generally significantly easier to parametrize a straight line ($1^{st}$ order) or a $2^{nd}$ order approximation as compared to a cloud of level correction points.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A method of pressure correction for level gauges, comprising:
   measuring a current measured gas pressure above a liquid in a semi-closed tank including at least one liquid component therein having an automatic tank level gauge installed on a roof of said tank at a variable gauge reference height;
   choosing a selected pressure correction factor from a range of pressure correction factors or from a pressure correction factor equation based on said current gas pressure above, and
   applying said selected pressure correction factor for automatically correcting a level reading provided by said tank level gauge to generate a corrected level reading which compensates for said current gas pressure above effects on said roof and on said variable gauge reference height of said tank level gauge.

2. The method of claim 1, wherein said semi-closed tank includes a breather valve.

3. The method of claim 1, wherein empirical data is used for generating said pressure correction factor equation.

4. The method of claim 1, wherein said pressure correction factors are stored in a lookup table, and wherein an interpolation mechanism is used for said choosing said selected pressure correction factor.

5. The method of claim 1, wherein said choosing and applying is performed by a processor included in said tank level gauge.

6. The method of claim 1, wherein said tank level gauge comprises a servo level tank gauge, or a radar level gauge.

7. The method of claim 1, further comprising using said corrected level reading for a custody transfer transaction, or for legal metrology where import duties are levied.

8. A level gauge system for mounting on a roof of a semi-closed storage tank, comprising:
   an automatic tank level gauge for determining a level reading for a liquid including at least one liquid component in said tank, the automatic tank level gauge being installed on a roof of said tank at a variable gauge reference height;
   a processor including a memory storing pressure correction factors or a pressure correction factor equation for correcting said level reading for a measured gas pressure above said liquid in said tank, said processor programmed for implementing:
   choosing a selected pressure correction factor from said pressure correction factors or said equation based on a received current gas pressure above, and
   applying said selected pressure correction factor for automatically correcting said level reading provided by said tank level gauge to generate a corrected level reading which compensates for said current gas pressure above effects on said roof and on said variable gauge reference height of said tank level gauge.

9. The level gauge system of claim 8, wherein said pressure correction factors are stored in a lookup table, and wherein an interpolation mechanism is used for said choosing said selected pressure correction factor.

10. The level gauge system of claim 8, wherein said choosing and applying is performed by said tank level gauge.

* * * * *